United States Patent [19]

Sakabe et al.

[11] 4,388,416
[45] Jun. 14, 1983

[54] CERAMIC DIELECTRIC COMPOSITIONS FOR TEMPERATURE COMPENSATING CAPACITORS

[75] Inventors: Yukio Sakabe; Yukio Hamaji, both of Kyoto, Japan

[73] Assignee: Murata Manufacturing Co., Ltd., Kyoto, Japan

[21] Appl. No.: 318,863

[22] Filed: Nov. 6, 1981

[30] Foreign Application Priority Data

Nov. 28, 1980 [JP] Japan ................................ 55-168870

[51] Int. Cl.³ ............................................. C04B 35/46
[52] U.S. Cl. .................................... 501/136; 361/321; 501/135
[58] Field of Search ................. 361/321; 501/135, 136

[56] References Cited

U.S. PATENT DOCUMENTS 3,869,398  3/1975  Yamaoka et al. ................... 501/136
4,119,554  10/1978  Fujiwara ............................. 501/136
4,226,735  10/1980  Sakabe ........................... 361/321 X Primary Examiner—Helen M. McCarthy
Attorney, Agent, or Firm—Birch, Stewart, Kolasch & Birch

[57] ABSTRACT

Ceramic dielectric compositions for temperature compensating capacitors, exhibiting a high dielectric constant, a relatively small temperature coefficient of dielectric constant and a very excellent linearity of the temperature coefficient, comprising 1.2–19.0% by weight of SrO, 12.2–17.4% by weight of CaO, 35.8–43.9% by weight of $TiO_2$, 15.7–37.6% by weight of $Bi_2O_3$, 1.9–14.6% by weight of $Pb_3O_4$ and 0.9–2.7% by weight of MgO.

1 Claim, 1 Drawing Figure

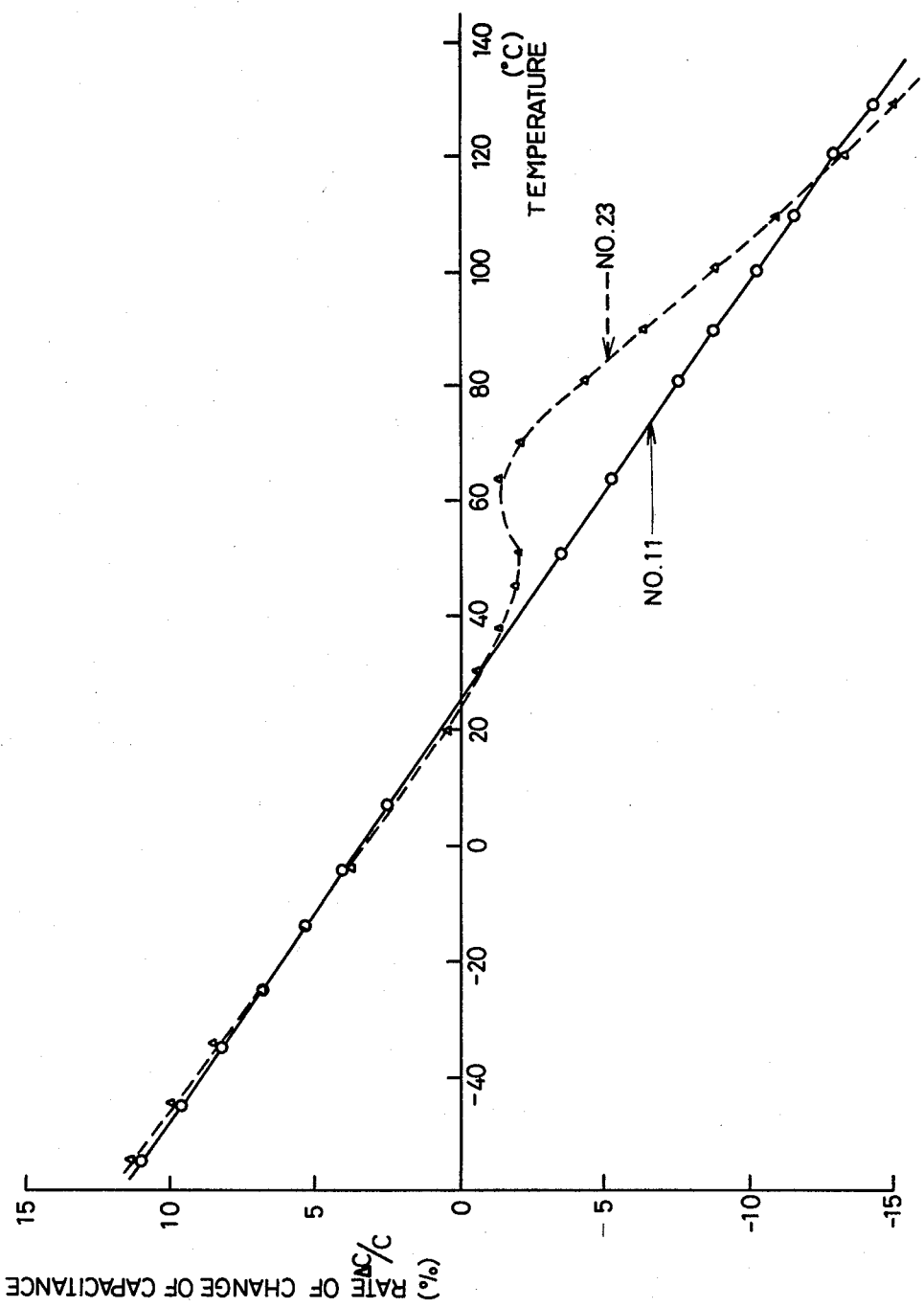

CERAMIC DIELECTRIC COMPOSITIONS FOR TEMPERATURE COMPENSATING CAPACITORS

BACKGROUND OF THE INVENTION

1. Field of the Invention

This invention relates to ceramic dielectric compositions for temperature compensating capacitors which have a high dielectric constant and a relatively small temperature coefficient of the dielectric constant with a very excellent linearity.

2. Description of the Prior Art

Up to this time, among ceramic dielectric compositions for temperature compensating capacitors, for example, (1) $CaTiO_3$-$La_2O_3$-$TiO_2$ system,
(2) $SrTiO_3$-$CaTiO_3$-$(Bi_2O_3.2TiO_2)$ system, and
(3) $PbTiO_3$-$CaTiO_3$-$La_2O_3$-$TiO_2$ system are known as compositions with relatively high dielectric constant. However, for example, the composition system (1) has an excellent characteristics in the dielectric loss at high frequencies and in the linearity of the temperature coefficient of a dielectric constant, but has a low dielectric constant to the extent of about 150. By the composition system (2), a composition with high dielectric constant to the extent of about 450 can be obtained, but the temperature coefficient thereof has a poor linearity, and, to the contrary, a composition having the excellent linearity of temperature coefficient of a dielectric constant has a low dielectric constant to the extent of about 250. Further, it is known that a very high dielectric constant, such as 600, can be obtained by the composition system (3). However, in this case, the temperature coefficient of a dielectric constant is undesirably increased and the linearity thereof is very poor. For example, the temperature coefficient varies from N 5000–N 6000 ppm/°C., wherein N indicates that the slope of the temperature coefficient is negative. Thus, by the composition system (3), it is very difficult to obtain a composition with a high dielectric constant, with a relatively small temperature coefficient thereof to the extent of not more than N 2000 ppm/°C. and with an excellent linearity thereof.

SUMMARY OF THE INVENTION

The present invention has been made in view of the above described background.

It is an object of the invention to provide ceramic dielectric compositions for temperature compensating capacitors which have a high dielectric constant to the extent of 350–500, a relatively small temperature coefficient of the dielectric constant to the extent of N 1200–N 2000 ppm/°C., and a very excellent linearity of the temperature coefficient.

The invention provides ceramic dielectric compositions for temperature compensating capacitors, comprising strontium oxide (SrO); calcium oxide (CaO); titanium dioxide ($TiO_2$); bismuth oxide ($Bi_2O_3$); trilead tetroxide ($Pb_3O_4$); and magnesium oxide (MgO); wherein the percentages by weight of the composition fall within the region of 1.2–19.0% by weight of SrO, 12.2–17.4% by weight of CaO, 35.8–43.9% by weight of $TiO_2$, 15.7–37.6% by weight of $Bi_2O_3$, 1.9–14.6% by weight of $Pb_3O_4$, and 0.9–2.7% by weight of MgO.

BRIEF DESCRIPTION OF THE DRAWING

The single graph in the accompanying drawing shows the temperature dependence of capacitors according to one embodiment of the present invention in comparison with a conventional composition.

DESCRIPTION OF THE PREFERRED EMBODIMENTS

A table is provided for showing various proportions of compositions and characteristics thereof of embodiments of the present invention and of comparative examples.

| Sample No. | Compositions (wt %) | | | | | | Characteristics | | | |
| --- | --- | --- | --- | --- | --- | --- | --- | --- | --- | --- |
| | SrO | CaO | $TiO_2$ | $Bi_2O_3$ | $Pb_3O_4$ | MgO | Dielectric Constant 1 MHz at 25° C. | Q 1 MHz at 25° C. | Temperature Coefficient (ppm/°C.) −30° C. to +25° C. | +25° C. to +85° C. |
| 1 | 19.0 | 12.2 | 40.7 | 15.7 | 11.0 | 1.4 | 472 | 1020 | N1990 | N1910 |
| 2 | 1.2 | 13.0 | 35.8 | 37.6 | 11.0 | 1.4 | 356 | 1180 | N1220 | N1290 |
| 3 | 7.1 | 17.4 | 41.1 | 22.0 | 11.0 | 1.4 | 354 | 1760 | N1560 | N1520 |
| 4 | 13.0 | 13.0 | 39.6 | 22.0 | 11.0 | 1.4 | 493 | 1030 | N1860 | N1770 |
| 5 | 11.9 | 13.9 | 39.8 | 22.0 | 11.0 | 1.4 | 468 | 1090 | N1860 | N1790 |
| 6 | 13.1 | 15.3 | 43.9 | 24.2 | 1.9 | 1.6 | 397 | 1510 | N1610 | N1560 |
| 7 | 8.3 | 14.8 | 39.4 | 25.1 | 11.0 | 1.4 | 418 | 1080 | N1590 | N1580 |
| 8 | 4.8 | 15.6 | 39.0 | 28.2 | 11.0 | 1.4 | 390 | 1280 | N1350 | N1360 |
| 9 | 4.8 | 15.9 | 38.5 | 28.7 | 11.2 | 0.9 | 353 | 1130 | N1380 | N1350 |
| 10 | 4.6 | 15.0 | 39.9 | 27.2 | 10.6 | 2.7 | 378 | 1120 | N1370 | N1380 |
| 11 | 5.7 | 14.9 | 38.8 | 28.2 | 11.0 | 1.4 | 431 | 1180 | N1380 | N1380 |
| 12 | 1.2 | 16.5 | 38.5 | 31.4 | 11.0 | 1.4 | 351 | 1680 | N1470 | N1480 |
| 13 | 2.4 | 15.6 | 38.2 | 31.4 | 11.0 | 1.4 | 383 | 1420 | N1390 | N1370 |
| 14 | 2.3 | 15.0 | 36.6 | 30.1 | 14.6 | 1.4 | 428 | 1010 | N1430 | N1450 |
| 15 | 14.2 | 13.9 | 40.7 | 18.8 | 11.0 | 1.4 | 451 | 1160 | N1980 | N1890 |
| *16 | 1.0 | 18.2 | 40.0 | 28.4 | 11.0 | 1.4 | 308 | 1380 | N1600 | N1530 |
| *17 | 20.9 | 10.8 | 40.2 | 15.7 | 11.0 | 1.4 | 510 | 390 | N2420 | N2050 |
| *18 | 4.9 | 11.4 | 44.2 | 22.1 | 16.0 | 1.4 | 464 | 530 | N1510 | N1570 |
| *19 | 2.5 | 15.2 | 34.3 | 36.2 | 11.4 | 0.4 | 301 | 1020 | N1370 | N1340 |
| *20 | 1.4 | 8.9 | 39.3 | 38.0 | 11.0 | 1.4 | 392 | 780 | N1290 | N1280 |

-continued

| Sample No. | Compositions (wt %) | | | | | | Characteristics | | | |
|---|---|---|---|---|---|---|---|---|---|---|
| | | | | | | | Dielectric Constant 1 MHz at 25° C. | Q 1 MHz at 25° C. | Temperature Coefficient (ppm/°C.) | |
| | SrO | CaO | TiO$_2$ | Bi$_2$O$_3$ | Pb$_3$O$_4$ | MgO | | | −30° C. to +25° C. | +25° C. to +85° C. |
| *21 | 14.2 | 17.4 | 43.5 | [12.5] | 11.0 | 1.4 | 318 | 1860 | N2310 | N2110 |
| *22 | 2.5 | 15.4 | 42.1 | 37.0 | [0] | [3.0] | 278 | 1610 | N1280 | N1310 |
| *23 | SrTiO$_3$—CaTiO$_3$—(Bi$_2$O$_3$.2TiO$_2$) system | | | | | | 310 | 3100 | N1400 | N860 |

(The numerical value enclosed by rectangles indicate the percentages of compositions beyond the scope of the present invention.)

Each sample was prepared as follows. As raw materials, SrCO$_3$, CaCO$_3$, MgO, TiO$_2$, Bi$_2$O$_3$, and Pb$_3$O$_4$ were prepared. Then, these raw materials were mixed to obtain compositions having proportions shown in the table. Then, these mixtures were calcined at a temperature ranging from 900°–1050° C. for two hours. The resulting calcined mixtures were mixed with a binding agent by a wet process. Then, after the water content of each mixture was evaporated, each mixture was formed into disks of 12 mm in diameter and 0.8 mm in thickness under pressure. These disks were fired at the temperature of 1150°–1250° C. for two hours. The resulting disks were formed with silver electrodes by applying silver paste on both surfaces of the disks and being baked, whereby various capacitors were obtained. Concerning each of these capacitors, a dielectric constant, a Q value and a temperature coefficient of the dielectric constant were measured in the frequency of 1 MHz and the results are shown in the table. In addition, the dielectric constant and the Q were measured at 25° C.

In the table, the samples of Nos. 16 through 24 with asterisks are beyond the scope of the present invention. The grounds for defining the proportion of each composition in accordance with the present invention will hereinafter be described.

As regards the percentage of SrO, that below 1.2% by weight of the same causes an insufficient effect on increasing a dielectric constant and that above 19.0% by weight of the same makes the Q value and the linearity of a temperature coefficient deteriorate. As regards the percentage of CaO, that below 12.2% by weight of the same makes the Q value and the linearity of a temperature coefficient deteriorate and that above 17.4% by weight of the same makes a dielectric constant decrease. As regards the percentage of Bi$_2$O$_3$, that below 15.7% by weight of the same causes an insufficient effect on increasing a dielectric constant and that above 37.6% by weight of the same makes the Q value and the linearity of a temperature coefficient deteriorate. As regards the percentage of TiO$_2$, that below 35.8% by weight of the same causes an insufficient effect on increasing a dielectric constant and that above 43.9% by weight of the same makes the Q value and the linearity of a temperature coefficient deteriorate. As regards the percentage of Pb$_3$O$_4$, that below 1.9% by weight of the same causes an insufficient effect on increasing a dielectric constant and that above 14.6% by weight of the same makes the Q value and the linearity of a temperature coefficient deteriorate. As regards the percentage of MgO, both of that below 0.9% by weight of the same and that above 2.7% by weight of the same make a dielectric constant decrease and the Q value deteriorate.

In the table, the samples of Nos. 1 through 15, within the scope of the present invention, exhibit high dielectric constants to the extent of 350, Q values of 1000 or above, and relatively small temperature coefficients to the extent of N 1200–N 2000 ppm/°C. Furthermore, as can be seen from the table, since the numerical values of temperature coefficients on either side of +25° C. are the same or almost the same with each other, it can be said, in general, that the linearities of temperature coefficients are excellent.

Any of the samples of Nos. 16 through 22, beyond the scope of the present invention, exhibit unfavorable characteristics of dielectric constants, Q values, linearities of temperature coefficients and so on in comparison with the samples within the scope of present invention.

The sample of No. 23 is a typical composition of a well known SrTiO$_3$-CaTiO$_3$-(Bi$_2$O$_3$.2TiO$_2$) system. This sample takes advantage of the transformation point of temperature coefficient of dielectric constant which appears when the proportion by weight of SrTiO$_3$ versus CaTiO$_3$ is about 7/3. This system has relatively high dielectric constant and Q value, and the temperature coefficient of dielectric constant measured at a constant temperature of 85° C. However, since the system takes advantage of the transformation point, as described above, the linearity of dielectric constant is quite unsatisfied. In addition, although it has been proposed that the transformation point is eliminated by adding some additives, the dielectric constant in this case is low to the extent of about 250.

The accompanying graph shows a comparison of the characteristics of the capacitance depending on temperature concerning the samples of Nos. 23 and 11, the latter being within the scope of the present invention. In this graph, the temperature (°C.) is plotted as abscissa and the rate of change of capacitance (%): $\Delta C/C$ as ordinate, wherein $\Delta C$ is a difference in electrostatic capacitance between at the respective given temperature and at 25° C. and C is the electrostatic capacitance at 25° C.

As also can be seen from this graph, each composition according to the present invention has the very excellent linearity of temperature coefficient of dielectric constant.

Concerning the proportion of SrO versus CaO, in case where SrO and CaO are converted to SrTiO$_3$ and CaTiO$_3$, respectively, the proportion of CaTiO$_3$ in the present invention is much greater than said well known composition and, therefore, the above described transformation point can not appear. Thus, the present ceramic dielectric compositions for temperature compensating capacitors are obtained by adding Bi$_2$O$_3$, TiO$_2$, $Pb_3O_4$ and MgO, as desired, to such SrO and CaO. It is believed that a high dielectric constant, a relatively small temperature coefficient nor a very excellent linearity of temperature coefficient can not be attained till they are obtained by means of the present invention.

What is claimed is:

1. Ceramic dielectric compositions for temperature compensating capacitors, which have a high dielectric constant of 350 to 500, a small temperature coefficient of dielectric constant of N 1200–N 2000 ppm/°C. and a good linearity of temperature coefficient, a Q value of 1000 or more and consisting essentially of:

strontium oxide (SrO);
calcium oxide (CaO);
titanium dioxide ($TiO_2$);
bismuth oxide ($Bi_2O_3$);
trilead tetroxide ($Pb_3O_4$); and
magnesium oxide (MgO);

wherein the percentages by weight of said composition fall within the region of 1.2–19.0% by weight of SrO, 12.2–17.4% by weight of CaO, 35.8–43.9% by weight of $TiO_2$, 15.7–37.6% by weight of $Bi_2O_3$, 1.9–14.6% by weight of $Pb_3O_4$, and 0.9–2.7% by weight of MgO.

* * * * *